Patented Apr. 12, 1932

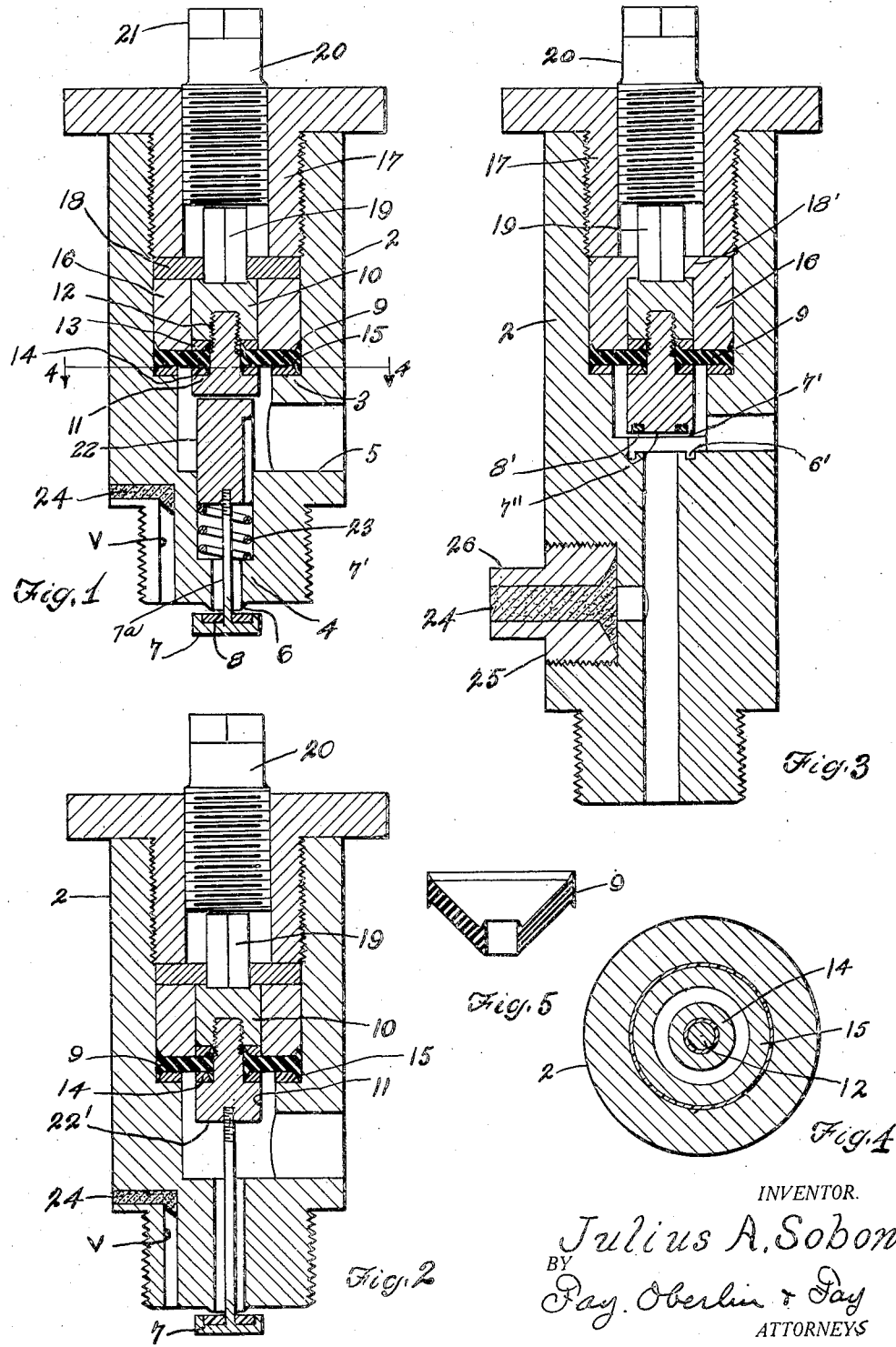

1,853,156

UNITED STATES PATENT OFFICE

JULIUS A. SOBON, OF CLEVELAND, OHIO

VALVE

Application filed May 28, 1928. Serial No. 281,134.

This invention relates to valves, and more particularly valves adapted for usage with high pressure gases, such for instance as are customarily dispensed in compressed condition in steel containing-cylinders; and it is among the objects of the invention to provide a valve construction which is capable of operating in a leak-proof manner, and which is yet not unduly complicated or expensive to manufacture. Other objects and advantages will appear as the description proceeds.

To the accomplishment of the foregoing and related ends, the invention, then, consists of the features hereinafter described and particularly pointed out in the claims, the following description and the annexed drawing setting forth in detail certain structure embodying the invention, such being illustrative however of but a few of the various ways in which the principle of the invention may be employed.

In said annexed drawings:—

Fig. 1 is an axial sectional view of an embodiment of the invention; Figs. 2 and 3 are similar views of modifications; Fig. 4 is a transverse section taken on a plane indicated by the line IV—IV, Fig. 1; and Fig. 5 is a sectional detail.

Referring more particularly to the drawings, there is shown in Fig. 1 a valve body 2 having a bore therethrough shouldered as at 3, and forming a communicating channel 4 to the cylinder or other container with which it is to be used, with an outlet laterally located as at 5. The valve seat 6, preferably presenting an annular raise or lip, is arranged to be closed by a valve disk 7, which ordinarily is provided with a seating insert 8 of vulcanite or other desired material. For operating the valve disk, a plunger is provided, and this is in turn sealed against leakage by means of a diaphragm member 9, of fluid-impervious material and flexible, preferably of a rubber composition.

The diaphragm is secured to the plunger; a convenient means for this involving a two part construction for the plunger, the sections 10 and 11 thereof being screw-threaded together, as at 12, and the diaphragm is thus clamped therebetween, bevel-edge washers or plates 13 and 14 being interposed against the diaphragm, for more securely gripping the same. The peripheral edge of the diaphragm is clamped in turn in a fixed position, a bevel-edge washer 15 resting on the ledge or offset 3 allowing of a very secure fastening, although in some instances the separate washer may be dispensed with, and the clamping be had directly against the corresponding part of the valve body. The diaphragm edges may be plain if desired, but for best results it is desirable that the diaphragm be provided with beaded edges on the order shown, a more positive engagement thus being had. The outer surface of the diaphragm member is backed up by backing means, comprising a corresponding portion of the plunger member 10, with washer 13 if employed and concentric therewith a backing ring 16. For holding the assemblage, a threaded bushing 17 is engageable within the bore of the valve body such as to retain the corresponding parts in position. For preventing rotary movement of the plunger 10 in its reciprocation, an aligning-guide is arranged. While in some cases this may be integral with the backing ring 16 for instance, more usually it is desirably separate as an aligning ring 18, the spud 19, preferably separate from the plunger, being squared or hexagonally-sectioned, and the opening in the aligning ring 18 being correspondingly shaped. Externally of the spud 19, an actuating screw 20 is threaded into the sleeve 17, so as to engage against the end of the spud 19, and such screw may be suitably squared at its end 21 to receive an operating hand wheel or lever.

The valve stem 7' carries an abutment 22 squared or channeled to allow gas flow therepast and resting on a spring 23.

As will be observed, in the form shown in Fig. 1, when the operating screw 20 is retracted outwardly, the plunger 10, 11 takes its outermost position, the resiliency of the spring 23 conducting thereto, and correspondingly the valve disk 7 is seated, the pressure within tending the more firmly to hold it in such position. When on the other hand, the screw 20 is turned inward, it pushes against the spud 19 and forces the plunger 10, 11 inwardly, the diaphragm yielding to the slight extent necessary, and the valve disk 7 is pushed from its seat, thereby allowing escape of the fluid from within, as regulated.

The diaphragm may be molded cup-shaped, as indicated in Fig. 5, or it may be molded in a flat plane. The latter is desirable in the form shown in Fig. 2, where no spring is provided. In this latter arrangement, it will likewise be seen that on turning the screw 20 in, the spud 19 and the plunger 10, 11 will be pushed so as to in turn move the valve stem and force the valve disk 7 from its seat, and thereby correspondingly allow release of the fluid. Screwing the member 20 back, again allows the valve disk to seat, and flow to be stopped.

As shown in Fig. 3, the valve seat instead of being directed toward the fluid-container, is located up in the bore, the annular seat 6' being directly facing the valve disk 7'. The general arrangement of the diaphragm 9 and its backing member 16 may be as in the foregoing, and additionally, if desired, the aligning member 18' may be integral with the backing ring 16, constituting a guide corresponding to the shape of the spud 19, and preventing its rotation when moved back and forth in the opening and closing of the valve.

The composition insert 8' in the valve disk 7' is desirably of such relative dimension with respect to the seat 6' as to align quite accurately, inner edge with inner edge. That is, the metallic face 7'' of the valve disk forms in effect a plug tending to just seat within the bore in the annular raise 6', while the composition insert as a whole then abuts directly against such raise. In this manner, it is impossible for composition insert material to stick in the opening and plug up the valve seat, as occurs with some types of valve construction heretofore known.

On account of the high pressure customarily carried in gas cylinders, whether of oxygen, hydrogen, nitrous oxide, or other gas, an element of danger is existent in case of exposure to high temperatures as in a fire, and disastrous explosions have been known to occur under such circumstances. To obviate such possibility, a safety vent may be applied, as vent-duct V, filled at its outer portion with a fuse metal 24 which will melt when exposed to a sufficiently elevated temperature, and thereby afford such release of contained gas as to prevent violent explosion in event of fire. Another construction therefor, is indicated as shown in Fig. 3, in which a removable plug 25 has screw threaded engagement into a corresponding bore in the body of the valve. Such plug is filled with fuse metal 24. The first-mentioned construction has the superior advantage of being independent of the valve-passage, and allows of the valve-seat being located below.

Other modes of applying the principle of the invention may be employed, change being made as regards the details disclosed, provided the means stated in any of the following claims, or the equivalent of such, be employed.

I therefore particularly point out and distinctly claim as my invention:—

1. A high-pressure valve, comprising a valve body having a bore therethrough, a valve disk adapted to close over such bore, a plunger for operating said disk, a fluid-impervious diaphragm engaging said plunger centrally and having beads at its inner and outer edges, and bevel-edged clamping plates engaging such beads.

2. A high-pressure valve, comprising a valve-body having a bore therethrough, a valve disk adapted to close over such bore, a plunger reciprocable for operating said disk, a fluid-impervious diaphragm engaging said plunger centrally and having beads at its inner and outer edges, means for backing said diaphragm across its outer surface, and bevel-edged clamping means for engaging the beaded edges of said diaphragm.

3. A high-pressure valve, comprising a valve body, a plunger reciprocable therein, a flexible fluid-impervious diaphragm engaging said plunger centrally and having beads at its inner and outer edges, said diaphragm having a permanent cupped set, backing means across the outer surface of said diaphragm, and means for clamping the beads of the diaphragm.

4. A high-pressure valve, comprising a valve-body, a plunger reciprocable therein, a flexible fluid-impervious diaphragm engaging said plunger centrally and having beads at its inner and outer edges, said diaphragm having a permanently cupped set, backing means across the outer surface of said diaphragm, and bevel-edged washers clamping the diaphragm beads.

5. A high-pressure valve, comprising a valve body having a bore therethrough, a disk to close over such bore, a flexible fluid-impervious diaphragm having beads at its inner and outer edges, said diaphragm having a permanently cupped set, backing means across the outer surface of said diaphragm, and bevel-edged washers clamping the diaphragm beads.

Signed by me this 21st day of May, 1928.
JULIUS A. SOBON.